R. T. SENTER.
PASSENGER CAR.
APPLICATION FILED JULY 15, 1911.
1,105,704.
Patented Aug. 4, 1914.
5 SHEETS—SHEET 1.
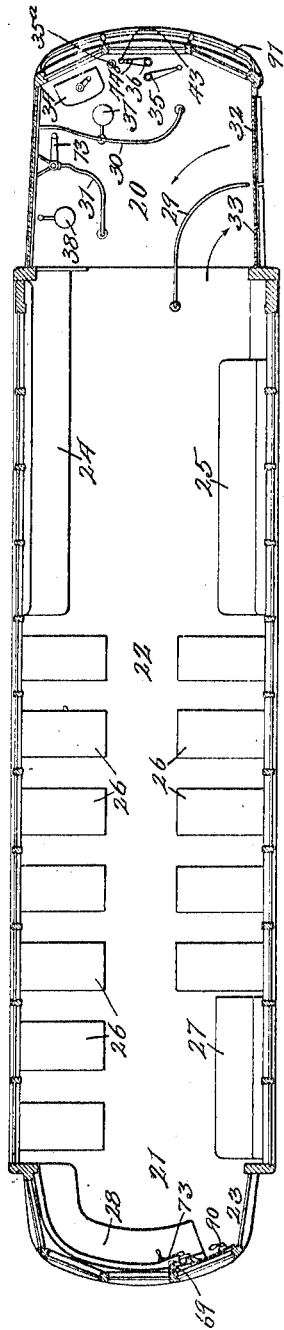
Witnesses:
Inventor:
Ralph T. Senter
Attys

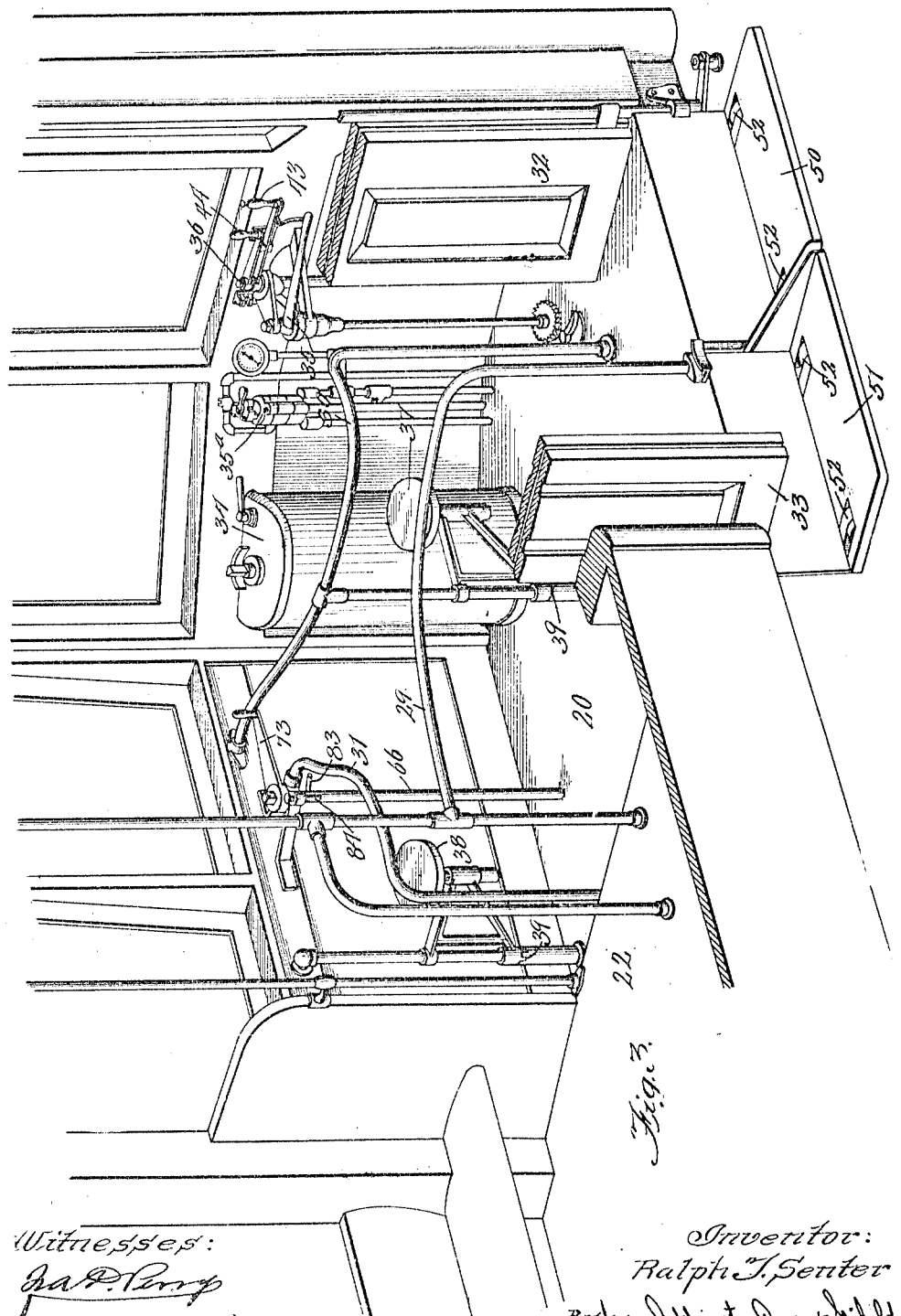

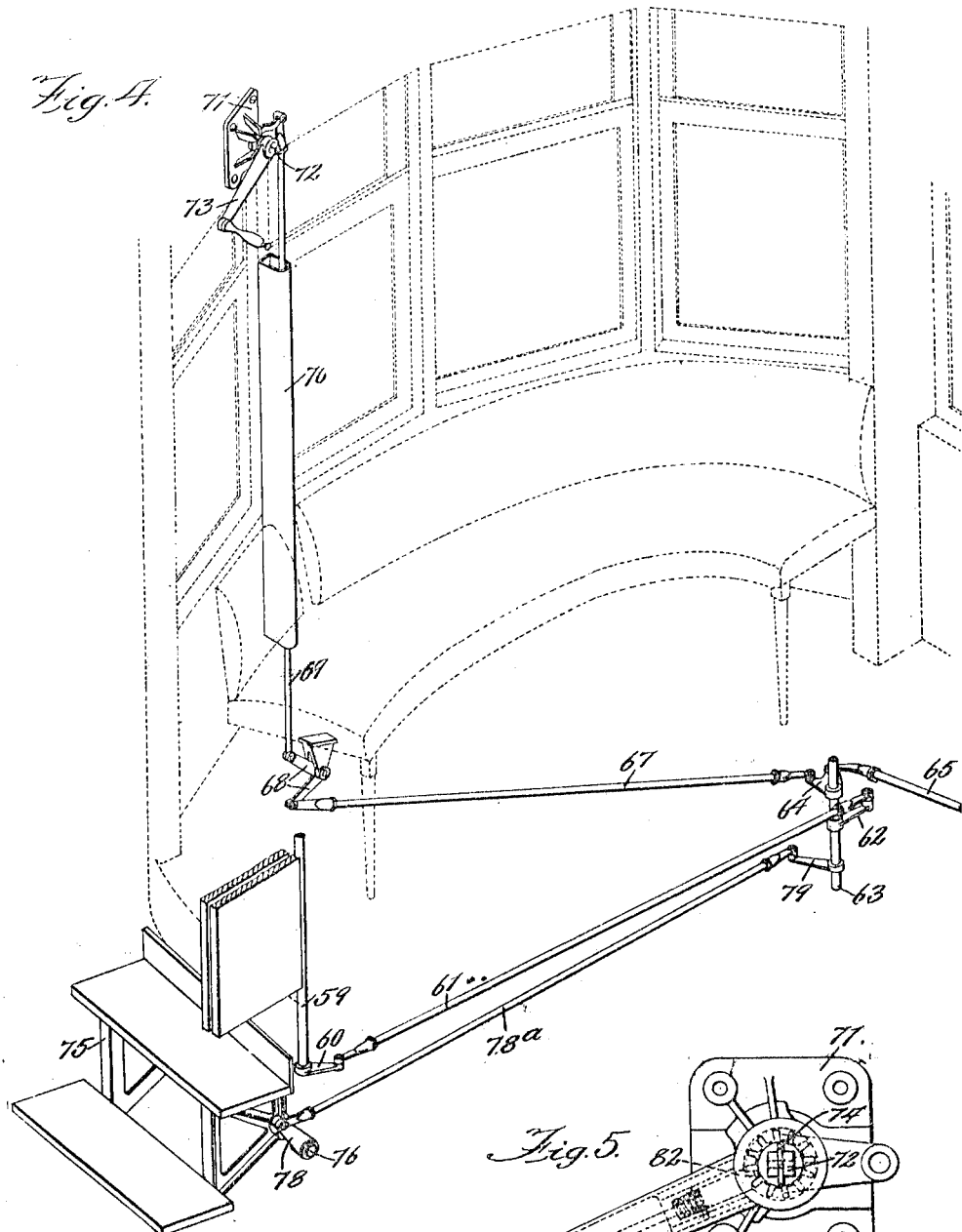

R. T. SENTER.
PASSENGER CAR.
APPLICATION FILED JULY 15, 1911.
1,105,704.
Patented Aug. 4, 1914.
5 SHEETS—SHEET 4.
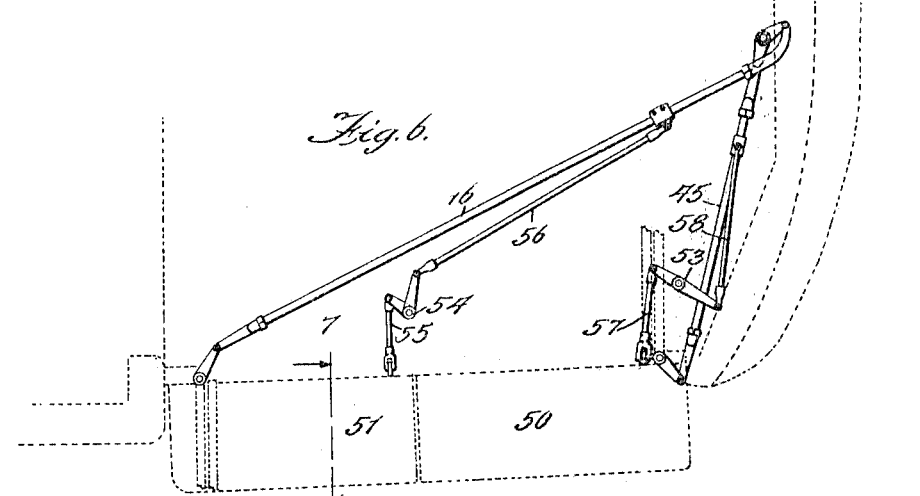
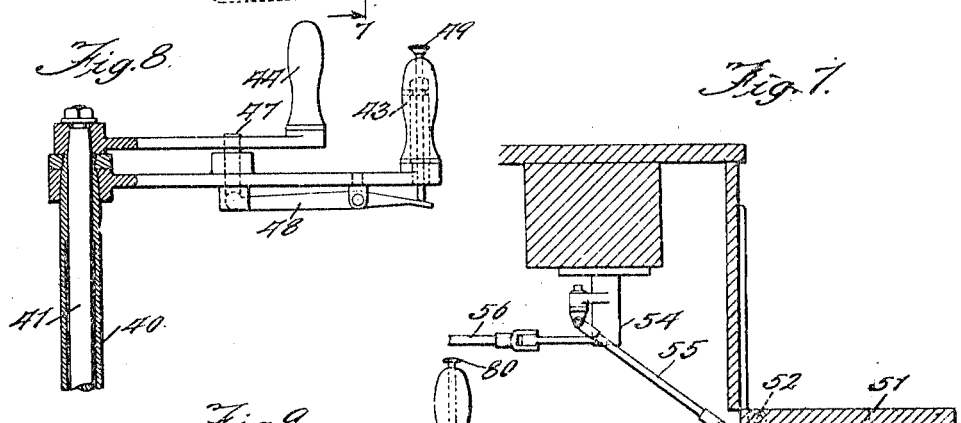
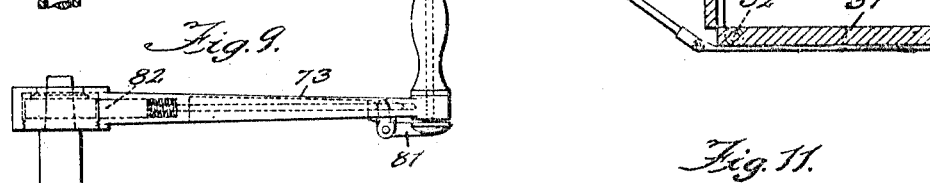
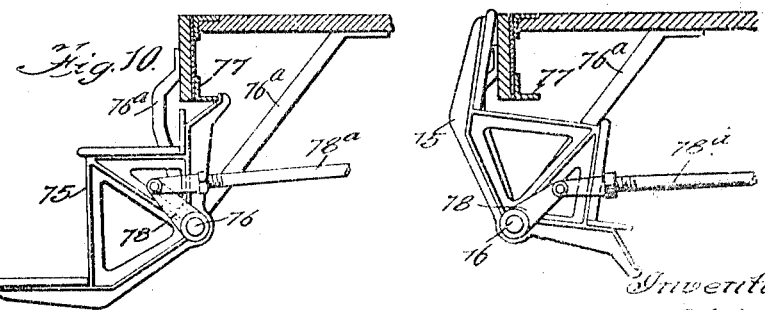
Witnesses:
Inventor:
Ralph T. Senter

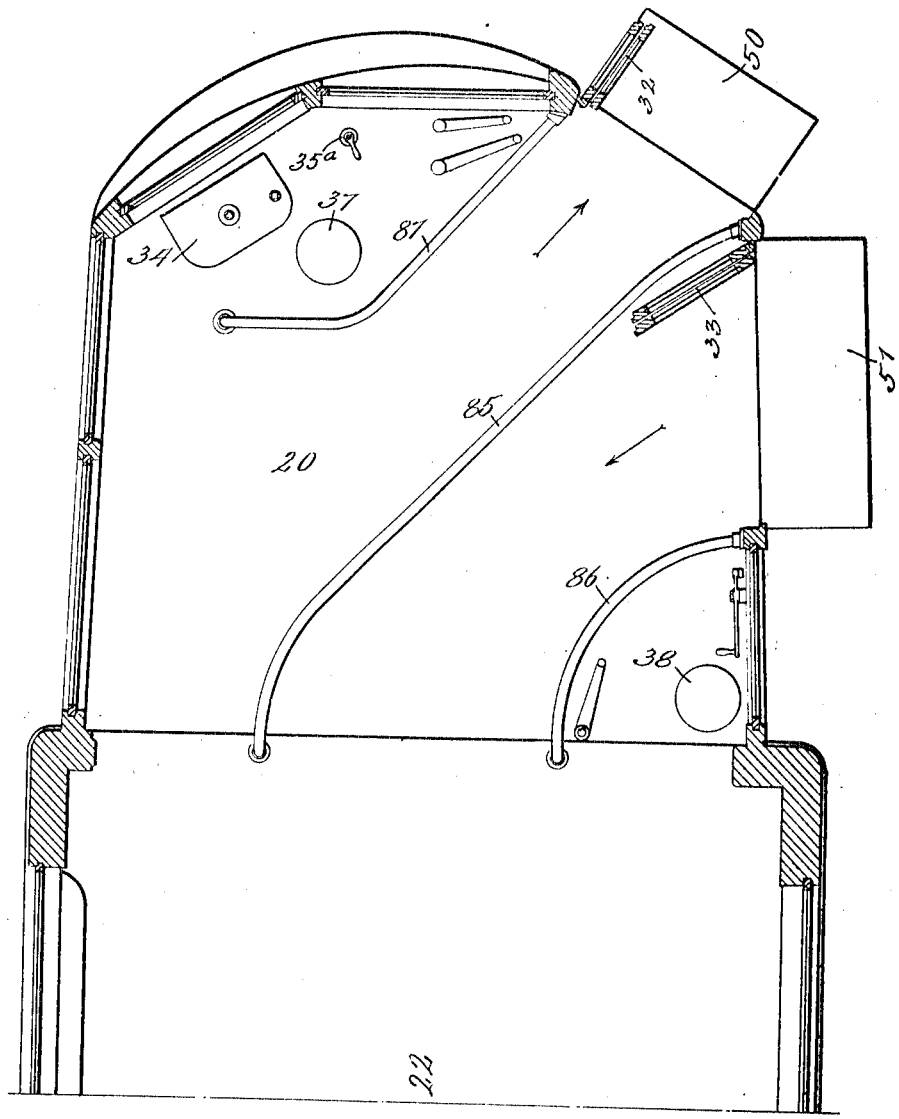

UNITED STATES PATENT OFFICE.

RALPH T. SENTER, OF BUFFALO, NEW YORK, ASSIGNOR, BY MESNE ASSIGNMENTS, TO THE NEAR-SIDE CAR COMPANY, OF NEW YORK, N. Y., A CORPORATION OF NEW YORK.

PASSENGER-CAR.

1,105,704.

Specification of Letters Patent.

Patented Aug. 4, 1914.

Application filed July 15, 1911. Serial No. 638,635.

*To all whom it may concern:*

Be it known that I, RALPH T. SENTER, a citizen of the United States, residing at Buffalo, in the county of Erie and State of New York, have invented new and useful Improvements in Passenger-Cars, of which the following is a full, clear, concise, and exact description, reference being had to the accompanying drawing, forming a part of this specification.

One object to this invention is to construct a passenger car so that the entrance and exit will be at the forward end of the car and to provide means by which the conductor can control the ingress of passengers and receive the fares from passengers as they pass from the platform into the body of the car; there being a separate exit passageway, also in close proximity to the conductor's station. By placing both the entrance and the exit at the forward end of the car, the passengers are more readily accommodated, particularly where the cars stop on the near side of the street as is now required in some cities, since the incoming passengers are not obliged to walk to the rear end of the car to board the same, and the outgoing passengers can all alight substantially at the cross walk. A saving in time results, since it is unnecessary to keep the car waiting for those who have been standing at the cross walk to travel the entire length of the car to enter it. And if the streets are muddy or covered with snow and slush, it is not necessary to wade through it the entire length of the car to reach the entrance. Accidents are avoided since passengers alighting from the front have a direct view of cars or automobiles approaching from the opposite direction, and should they desire to pass behind the car they must necessarily await its forward movement and consequently do not pass directly into the path of vehicles moving in the opposite direction. Aside from these advantages the control of the car and passengers is facilitated, because the conductor's attention can be devoted to the passengers, in the matter of collecting fares, making change, issuing transfers, and in other ways, while the motorman can attend to the doors and the boarding and alighting of the passengers. A general betterment of the service thus results to the mutual satisfaction of the operating company and the public.

A further object of the invention is to provide an emergency door at the rear of the car, which can be opened or closed preferably from the conductor's station at the forward end of the car, or, if necessary, at a point near the rear of the car. This is of value in case of accident or in case of a series of prepayment stations on the line as hereinafter described.

The invention also relates to improvements for operating the doors and also for operating the steps in front of said doors.

Other objects will appear from the detailed description and claims to follow, reference being had to the accompanying drawings illustrating embodiments of my invention and forming part of this application, in which the same reference characters are used throughout the several views to designate like parts, and in which:

Figure 1 is a sectional plan view illustrating the divisions of the front platform; the arrangement of the seats, and the rear emergency door—the doors being closed and the steps raised; Fig. 2 is a plan view, showing the front door operating mechanism and the emergency door operating mechanism; the outline of the car being shown in dotted lines; Fig. 3 is a sectional perspective view of the front platform, showing the doors open and the steps lowered; the seats for the conductor and the motorman being in position to be used; Fig. 4 is an outline perspective view of the rear portion of the car; showing the rear door and step operating mechanism in full lines; the door being open and the step lowered; Fig. 5 is a detached view of the rear door operating mechanism. Fig. 6 is a plan view, showing the outline of a portion of the front platform in dotted lines and illustrating the mechanism for operating the platform doors; the doors being in open position and the steps lowered; Fig. 7 is a sectional view on the line 7—7, Fig. 6; showing the step lowered; Fig. 8 is a view in elevation; showing the two hand levers for operating the platform doors—one shaft being mounted within the other; the tubular shaft being shown in section. This view also illustrates the means for locking the two levers together, when both doors are opened or closed in unison; Fig. 9 is a side view of the rear door operating handle. This handle is detachable and can be used either on the post at the conductor's station or on the shaft at the rear of the car; Fig. 10 is a sectional view of the rear portion of the car, showing the emergency step lowered; Fig. 11 is a similar view, showing the step raised; Fig. 12 is a sectional plan view illustrating a modification of the arrangement of the platform.

As illustrated particularly in Fig. 1, the car is provided with a long front platform 20 and the usual rear platform is displaced by a round rear section 21; the floor of which is preferably on a level with the floor of the main body 22 of the car. The floor of the platform 20 is preferably below the level of the floor of the body of the car and there is one step leading from the platform to the street, but there are two steps leading from the emergency door 23 at the rear of the car to the street. These steps are preferably, in front, of the folding type, and in the rear of the roll over type.

In the body 22 of the car, near the forward end, are two longitudinal seats 24 and 25, allowing ample standing room, the seat 25 terminating short of the exit doorway to provide sufficient room for the outgoing passengers, while in the rear half of the car there are transverse seats 26 and near the emergency door there is a short longitudinal seat 27 and at the extreme rear of the car there is a seat 28 conforming to the shape of the end of the car. The arrangement of the two latter seats provides ample room for the passengers in going out the emergency door and affords additional standing room in case of necessity. The shortening of the rear end seat 28 near the emergency exit not only provides clearance for the passageway, but furnishes a place for the conductor to stand while looking after and operating the said emergency door from the rear end of the car, as will be hereinafter explained.

The forward platform is divided into stations for the motorman and conductor and passageways for the ingress and egress of the passengers, preferably by three rails 29, 30 and 31, supported in any desired or usual manner as shown by Figs. 1 and 3. One rail 29 incloses the motorman's station; another rail 30 incloses the conductor's station, and the other rail 31 divides the ingress passageway from the egress passageway. The ingress passageway, in the present instance, is the central passageway and the forward door 32 controls the admission of passengers to the car, while the other door 33 of the platform controls the exit of passengers from the car. Within the motorman's station is the usual controller box 34; hand brake 35, air brake controller 35ª, and the operating means 36 for opening and closing the side doors 32 and 33, as hereinafter described, by which said doors can be opened and closed in unison or separately, as desired. At the motorman's station is a swinging seat 37 and within the conductor's station is also a swinging seat 38 each mounted on a post as shown in Fig. 3, so that the seats can be shifted into and out of position, as the conductor and motorman must stand during the time the car is passing through the thickly populated districts. The seats have tongues 39 which enter notches in the supporting standards, Fig. 3, so that they may be fixedly adjusted in any position. There is a space between the rails separating the conductor's station from the motorman's station into which a passenger can step from the ingress passageway, if it is necessary for the conductor to make change, so as not to interfere with the free movement of the other passengers entering the body of the car.

The side doors 32 and 33 at the front platform are operated from the two vertical shafts 40 and 41, Fig. 8, one mounted within the other, and each having an operating lever and handle designated 43 and 44, respectively. Each of these shafts has an arm at the lower end, under the platform, and on the pivot rod of each door is a corresponding arm to which the arms on the shafts are respectively connected by rods 45 and 46, as shown. On one of the two operating levers, which are mounted on the shafts 40 and 41, Fig. 8, in this instance on the lever 43, is mounted a movable pin 47, carried by a lever 48 pivoted to one of the arms 43, and this lever is actuated by a pin 49 extending through the handle on the said lever so that when the said pin is pushed down as by the thumb of the operator while grasping the handle it will move the pin 49 into an opening in the other arm so as to lock the two arms together. Then on moving said arm, both doors will be simultaneously opened or closed.

The steps 50 and 51 at the forward end of the car are suitably pivoted as at 52 so as to swing up against the vertical face of the steps, and these steps are operated by levers 53 and 54 mounted on the underside of the car sill and suitable connecting rods, leading therefrom to the steps and door operating rods, respectively. The lever 54, for instance, is connected by the rod 55 with the step 51 in such manner, as indicated in Fig. 7, as to raise and lower said step when the lever 54 is moved one way or the other about its pivot; and the other arm of said lever 54 is connected by the rod 56, as seen in Fig. 6, to receive motion directly from the corresponding door operating rod 46. Likewise, rods 57 and 58, Fig. 6, connect the lever 53 with the step 50 and corresponding door operating rod 45. The opening or closing of the doors 32 and 33, therefore, by the motorman, either separately or simultaneously correspondingly lowers or raises the steps 50 and 51.

The rear door 23 may be operated either from the front platform or from the rear of the car. This door is a double door and swings on a single pivot rod 59 (Fig. 4) which is connected through the medium of an arm 60 and rod 61 to an arm 62 on a vertical rock shaft 63. A bell crank lever 64 on this shaft has the two arms connected by a rod 65 to an arm on the lower end of the forward operating shaft 66 at the conductor's station, and this shaft is provided with a detachable handle, as later described. The other arm of the bell crank lever 64 is connected by a rod 67 to a bell crank lever 68 under the rear of the car, which, in turn, is connected by a vertical rod 69 running through a protecting covering or casing 70 to a corresponding arm on an overhead shaft mounted on a bracket 71 secured to the rear wall of the car. The shaft on which the arm is mounted has a squared end 72 (Figs. 4 and 5) to receive a detachable handle 73 so that the conductor can operate the door, either from his station at the front of the car, or from a point adjacent the door at the rear of the car. The parts are, preferably, so arranged that he can detach the handle at the forward end of the car and with it operate the door from the rear of the car. The outer end of this squared shaft at the rear of the car is provided with a slot in which is pivoted a cross member 74 adapted to be turned endwise on its pivot pin so that the handle can be put on or slipped off the squared end of the shaft, but when in the position shown in Fig. 5 the handle is prevented from inadvertently coming off. The rear step 75 is moved to its operating position when the door is opened and is tilted up out of the way when the door is closed. The step structure consists of two threads mounted on two cast iron brackets near the ends of the treads and is so balanced that the upper tread and parts connected therewith, when the step is tilted, forms a counterbalance to hold the step in the proper position, without using extra weights (Fig. 11). The step as a whole is pivoted on a shaft 76, which is supported from the frame of the car by suitable supporting brackets 76ª. When down, the upper ends of the step brackets engage an angle iron stop 77 attached to the car framing, and when tilted up, as seen in Fig. 11, the lower tread engages the face of the sill, and the step does not then project outwardly beyond the limits of the side of the car. An arm 78 at one end of the rear step shaft 76 is connected by a rod 78ª to an arm 79 on the vertical shaft 63 to which the bell crank lever 64 is connected so that, when the door 23 is opened or closed, the step 75 is moved to the operative or inoperative position.

The operating lever 73 for the rear door, is shown more in detail in Figs. 5 and 9 and comprises a ratchet lever having a handle in which is a pin 80, which actuates a bell crank lever 81 suitably connected to a rod sliding within the handle and having on its end a tooth 82 which enters one of the notches in a circular head rotatably mounted in the enlarged end of the lever and having a squared opening therein to receive the squared end 72 of the shaft. Back of the tooth 82 is a coiled spring tending to force the tooth into engagement with the notches in the said head. By pressing on the pin 80, the handle can be adjusted to any position on the shaft.

In order to prevent the opening of the rear door without the conductor's consent, the shaft 66 at the front platform is prevented from rotation by a pin 83 projecting therefrom, striking against a pin 84. The shaft 66 cannot be rotated until the pin 84 is removed or raised, so as to clear the projection or pin 83 on the said shaft. Assuming the handled lever 73 to be in the position shown in Fig. 3, when the door is closed, in order to turn the lever so as to open the door, the pin 84 can be raised, or removed, to allow the pin 83 on the shaft to clear it. If it is wished to open the door by operating the rear mechanism then the conductor first removes the pin 84; taking the operating lever to the rear mechanism and placing it in position so as to be turned, as it will be understood that when the rear operating mechanism is turned, the shaft 66 also turns.

A suitable locking device, operating independently of the front control of this door, will of course be used, for the purpose of preventing the rear door from being thrown open by passengers falling against it, and the passengers falling out. This lock will work automatically with the shaft on which the door is hung, so that if the conductor should fail to replace the pin 84, no harm can be done.

In Fig. 12, is shown a modification of the arrangement of the front platform rails so that the ingress passage will be separated from the egress passage by a diagonal rail 85 and the conductor's station will be divided from the ingress passage by a curved rail 86, while the motorman's station will be separated from the egress passage by a rail 87. This rail can be of any form desired. The ingress passageway has a doorway at the side of the car which can be operated by the conductor or by the motorman, as desired, and in any suitable manner, and the egress passageway has a doorway at the end of the car near one side, as clearly shown in Fig. 12. By this construction the conductor has full control of the ingress passage and the motorman has full control of the egress passage.

The doors are, of course, provided with any usual or desired guides to cause them to fold up, as indicated in the drawings, when open and to expand or spread out to close the door openings. When the doors are closed the steps are folded up within the limits of the side of the car. In case the front platform is made of even height with the floor of the body of the car, the forward steps may be made with two treads.

If the car is used on a railway having prepayment stations on the station platforms, then the emergency doorway at the rear of the platform, as well as the forward doorways, can be used for the ingress of passengers. The conductor, in this case, leaves his station on the front platform and places himself at the rear station in close proximity to the door at the rear of the car. In this case the motorman controls the ingress of passengers at the forward end of the car, but collects no fares, as the fares have all been paid by the passengers upon entering the platform of the station. As soon as the car passes the series of stations at which passengers prepay their fares, the conductor can then leave his station at the rear of the car and return to his station at the front platform.

A farebox or turnstile may be provided at the conductor's station at the forward end of the car, if desired.

An emergency air brake valve 90 (Fig. 2) located inside of the car and adjacent the rear door operating lever 73 at the rear end of the car is suitably connected with the air brake system of the car to permit an emergency application of the brakes from that end of the car independently of the motorman's valve 35ª. By this arrangement the conductor can go to the rear end of the car and operate the car by means of the usual signal bell to the motorman, when the car is backing up or taking a Y, the rear emergency valve being operated by him under such conditions in case of a threatened accident to pedestrians or vehicles.

A guard railing or safety grab handle 91 (Fig. 1) running across the front of the car just below the vestibule windows and projecting out from the front of the car a short distance, is designed and so placed as to be most readily seized by a person about to be struck by the car to prevent being drawn thereunder.

It will be noted that my invention contemplates the division of the forward portion of the car body, the platform, into a plurality of divisions, two of which constitute ingress and egress passageways and are separated by a dividing structure. A third division constitutes a motorman's station and contains operating mechanism for the doors controlling the passageway, and, in the present instance, the fourth constitutes a conductor's station from which the rear door may be controlled and which is so arranged with reference to the other divisions of the platform as to provide a recess into which a passenger may step to permit other passengers to enter the car. It will be understood that while I have thus described in detail an embodiment of my invention, various changes, alterations and modifications may be made therein without departing from the spirit and scope of the same as set forth in the appended claims.

Having thus described my invention, what I claim as new and desire to secure by Letters Patent, is—

1. A passenger car comprising a body portion, a front platform, separate ingress and egress passageways on the front platform leading to and from the body portion of the car, cross seats in the body of the car, and longitudinal seats at the sides of the car near the forward end of the body portion to provide standing room and clearance for the passageways.

2. A passenger car comprising a body portion having an inclosed rear end, a front platform divided into separate ingress and egress passageways, cross seats in the body of the car, and longitudinal seats along the sides of the car near the forward end thereof.

3. A passenger car comprising a body portion having an inclosed rear end, a front platform divided into separate ingress and egress passageways, cross seats in the body of the car, longitudinal seats along the sides of the car near the forward end, and a curved seat along the rear curved end of the car.

4. A passenger car comprising a body portion having an inclosed rear end, a front platform divided into separate ingress and egress passageways, an emergency door in the rear end of the car, a longitudinal seat along the side of the car near said door, a curved seat along the curved end of the car, said latter seat terminating short of the said door.

5. In a passenger car, the combination with the conductor's and motorman's stations at the front end of the car, of separate ingress and egress passageways at said end of the car controlled from that same end, and an emergency door at the rear of the car also controlled from the said front end.

6. In a passenger car, the combination with the conductor's and motorman's stations at the front end of the car, of separate entrances and exits at said end controlled from that same end of the car, and an emergency door at the rear of the car controlled from either the front or rear end of the car.

7. In a passenger car, the combination with the conductor's and motorman's stations at the front end of the car, of separate entrances and exits at said end controlled from that same end of the car, and an emergency door at the rear of the car controlled from the conductor's station at the forward end.

8. In a passenger car, the combination with the conductor's and motorman's stations at the forward end of the car, of separate ingress and egress passageways at said end of the car, doors for said passageways controlled from the motorman's station, and an emergency door at the rear of the car controlled from the said conductor's station.

9. In a passenger car, the combination with the conductor's and motorman's stations at the forward end of the car, of separate entrance and exit passageways at said forward end, an emergency door at the rear of the car controlled from either end of the car, and means controlled at the forward end of the car for locking said emergency door closed.

10. In a passenger car, the combination with the conductor's and motorman's stations at the front end of the car and dividing structures to form said stations, of an entrance and a separate exit at the forward end of the car on the same side of the center line of the car.

11. In a passenger car, the combination with the conductor's and motorman's stations at the front end of the car and dividing structures to form said stations, of an entrance and a separate exit at the forward end of the car on the same side of the center line of the car, and doors for said exit and said entrance controlled from said end of the car.

12. In a passenger car, the combination with the conductor's and motorman's stations at the front end of the car and divisional structures to form said stations, of separate entrance and exit passageways at the forward end of the car opening on the same side of the center line of the car, and doors for said exit and said entrance controlled from the motorman's station.

13. The combination in a passenger car, of a body portion, a platform at one end thereof, one side of the platform being open to allow for the ingress and egress of passengers, a rail separating the ingress from the egress passageway, and a rail separating the ingress passageway from the conductor's station on the front platform.

14. The combination in a passenger car, of a body portion, a platform at one end thereof, one side of the platform being open to allow for the ingress and egress of passengers, a rail separating the ingress from the egress passageway, and rails separating the ingress passageway from the motorman's and conductor's station on the front platform, the last mentioned rails being arranged to form a recess between the stations of the motorman and the conductor to allow a passenger to stand therein while receiving change.

15. The combination in a passenger car, of a body portion, a platform at the forward end of the body portion, rails dividing the platform into three sections, a central section for the ingress of passengers and a side passage for the egress of passengers, both leading to one side of the platform, and a side section for the motorman and conductor, the last-mentioned section being divided to separate the conductor's station from that of the motorman, doors arranged to close the ingress and egress passageways, and means for closing the doors located in close proximity to the motorman's station.

16. The combination in a passenger car, of a body portion, a platform at the forward end of the body portion, open at one side, two doors closing said side of the platform, a motorman's station at the forward end of the platform, means at the motorman's station for controlling the said doors, a conductor's station at the closed side of the platform and at the rear thereof, rails on the platform to separate the conductor's and motorman's stations from the ingress passageway and the ingress passageway from the egress passageway, with a doorway at the rear of the car, a door for closing said doorway, and means for operating the said door.

17. In a passenger car, a body portion, a platform at the forward end of the body portion open at one side, two doors closing said side of the platform, a motorman's station at the forward end of the platform, means at the motorman's station for controlling the said doors, a conductor's station at the closed side of the platform and near the rear thereof, and rails on the platform to separate the conductor's and motorman's station from the ingress passageway and the ingress passageway from the egress passageway.

18. The combination in a passenger car, of a body portion, a platform at the forward end of the body portion, a doorway at the rear of the car, a door for closing said doorway, means for dividing the platform so as to form ingress and egress passageways therein, and stations for the motorman and conductor, and means at the conductor's station for operating the rear door.

19. The combination in a passenger car, of a body portion, a platform at the forward end of the body portion, a conductor's station at the platform, said car having a doorway in one side and near the rear end thereof, a door for closing said doorway, and means at the conductor's station for operating the said door.

20. The combination in a passenger car, of a body portion, a platform at the forward end, open at one side, doors arranged to close that side of the platform, means for operating said doors, a doorway at the rear of the car at the same side as the opening at the front platform, a conductor's station, rails dividing the platform to form ingress and egress passageways and a conductor's station, a door for closing the rear doorway, and means at the conductor's station for opening and closing said door.

21. In a passenger car, a body portion, a platform at one end of said body portion, said platform comprising four divisions, two of said divisions constituting ingress and egress passageways, respectively, said passageways extending to the exterior of the car on the same side of the center line of the car, one of said divisions constituting a motorman's station and the other of said divisions constituting a conductor's station, and a dividing structure separating said ingress and egress passageways.

22. In a passenger car, a body portion, a platform at one end of said body portion, said platform comprising four divisions, two of said divisions constituting ingress and egress passageways, respectively, a divisional structure to separate said passageways, doors to close said passageways, another of said divisions constituting a motorman's station, means located at said motorman's station to control said doors, the fourth of said divisions constituting a conductor's station, an exit near the opposite end of said car, a door to close said exit, and means located at said conductor's station to control said door.

23. In a passenger car, a body portion, and a platform at one end of said body portion, said platform comprising three divisions, two of said divisions constituting ingress and egress passageways, respectively, said passageways extending to the exterior of the car on the same side of the center line of the car, a divisional structure to separate said passageways, doors to close said passageways, another of said divisions constituting a motorman's station, a divisional structure to form said station, and means located at said motorman's station to control said doors.

24. In a passenger car, a body portion, a platform at the forward end of said body portion, said platform comprising four divisions, two of said divisions constituting ingress and egress passageways, respectively, a divisional structure to separate said passageways, another of said divisions constituting a motorman's station and the other of said divisions constituting a conductor's station, said motorman's station and said conductor's station being spaced apart to form between them a recess communicating with the ingress passageway.

25. In a passenger car, a body portion, a platform at one end of said body portion, dividing structures to divide said platform into ingress and egress passageways, and a conductor's station, said dividing structures being arranged to provide a space adjacent to said conductor's station and communicating with said ingress passageway.

In witness whereof, I have hereunto subscribed my name in the presence of two witnesses.

RALPH T. SENTER.

Witnesses:
WM. A. BARR,
MURRAY C. BOYER.